(12) United States Patent
Gupta

(10) Patent No.: US 7,020,870 B2
(45) Date of Patent: Mar. 28, 2006

(54) DYNAMIC SIZE FOR LANGUAGE VARIABLES

(75) Inventor: Sumit Gupta, Newark, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 675 days.

(21) Appl. No.: 10/146,604

(22) Filed: May 15, 2002

(65) Prior Publication Data

US 2003/0217351 A1 Nov. 20, 2003

(51) Int. Cl.
*G06F 9/44* (2006.01)
(52) U.S. Cl. .................... 717/114; 717/116
(58) Field of Classification Search ........ 717/114–118, 717/140, 163–165
See application file for complete search history.

(56) References Cited

U.S. PATENT DOCUMENTS

| | | | | |
|---|---|---|---|---|
| 5,276,881 | A * | 1/1994 | Chan et al. ............... | 717/147 |
| 5,339,419 | A * | 8/1994 | Chan et al. ............... | 717/147 |
| 5,687,377 | A | 11/1997 | Pasquariello | |
| 6,023,583 | A * | 2/2000 | Honda ..................... | 717/158 |
| 6,182,281 | B1 * | 1/2001 | Nackman et al. ......... | 717/116 |
| 6,865,657 | B1 * | 3/2005 | Traversat et al. ......... | 711/170 |
| 6,874,066 | B1 * | 3/2005 | Traversat et al. ......... | 711/135 |
| 6,901,587 | B1 * | 5/2005 | Kramskoy et al. ........ | 717/154 |
| 6,938,245 | B1 * | 8/2005 | Spertus et al. ............ | 717/127 |
| 6,941,410 | B1 * | 9/2005 | Traversat et al. ......... | 711/6 |

OTHER PUBLICATIONS

Zhuang et al, "Storage assignment optimization through variable coalescence for embaded processor", ACM LCTES, pp 220-231, 2003.*
Hunleth et al, "Footprint and feature management using aspect oriented programming techniques", ACM LCTES, pp 38-45, 2002.*
Clausen et al, "Java bytecode comprission for low end embaded systems", ACM Trans. Prog. Lang. and Sys. vol. 22, No. 3, pp 471-489, 2000.*
Atienza et al, "Dyanmic memory management design methodology for reduced memory footprint in multimedia and wireless network applications", IEEE Date, pp 1-6, 2004.*

* cited by examiner

*Primary Examiner*—Anil Khatri
(74) *Attorney, Agent, or Firm*—Meyertons Hood Kivlin Kowert & Goetzel, P.C.; B. Noël Kivlin

(57) ABSTRACT

A method is provided, the method comprising defining an actual size of each variable in a programming language at a declaration time when the actual size of the respective variable can be defined and declaring at least one variable in the programming language to have a dynamic size at the declaration time when the actual size of the at least one variable is not known. The method also comprises defining the actual size of the at least one variable in the programming language when the actual size of the at least one variable becomes known after the declaration time.

40 Claims, 11 Drawing Sheets

DYNAMIC SIZE FOR LANGUAGE VARIABLES

BACKGROUND OF THE INVENTION

1. Field of the Invention

This invention relates generally to computer software and, more particularly, to a method for providing variable sized data members.

2. Description of the Related Art

There is a constant drive within the computer industry to decrease wasted space in data storage and to increase the speed, ease and convenience of adding, editing and/or deleting stored data. Programming languages typically provide the facility of storing data into storage areas called "variable," for example. Depending on the programming language specifications, variables are of different types and sizes. For example, in the C programming language, the variable type "int" (for integer type) can store a 32-bit signed integer quantity int $i=\pm b_{31}b_{30}b_{29} \ldots b_3b_2b_1$, where $b_{31}$ is the most significant bit, $b_1$ is the least significant bit and $\pm$ is the sign bit.

Most programming languages also allow the programmer to define new data types (variables) by combining together existing types. For example, a variable type "Bank_Account" can have the following data types (using the C programming language structures):

```
struct Bank_Account {
    int     account_no;
    int     balance;
    char    account_type;
    char    member_name[100];
};
``` where the last member of the data structure "member_name" defines the member name to be an array of 100 characters or bytes (8 bits). This means that there are a maximum of 100 bytes reserved for storing the name of the member. If the actual name of the member is longer than 100 bytes long, the actual name will be truncated down to only 100 bytes (typically the first 100 bytes in the member name reading from right to left). Also, as shown in FIG. 1, if the actual member name 100, such as "Jane Doe," is less than 100 bytes, only the first 8 bytes will be used and the remaining 92 bytes will not be used.

All data types in a programming language have a fixed size, not only the basic ones like "int," "char" and the like, but also the ones that are built by combining the basic types, as in the "Bank_Account" example described above. There are conventionally two ways to store the member name. The first conventional way is to estimate the maximum space required to store the biggest member name and then allocate that maximum amount of space as a part of the data structure, as in the member name 100 shown in FIG. 1. However, this approach typically wastes too much storage space because most actual member names will not be more than about 20 characters or bytes long, yet the programmer is allocating 100 bytes of storage space for all the member names uniformly.

The second conventional way is not to allocate space for storing a member name in the data structure at all, but rather to allocate this storage space somewhere else. For example, as shown in FIG. 2, the member name "Jane Doe" is not stored in a data structure storage with cross-reference to member name storage 200, but rather in a separate member name storage 220 different from the data structure storage with cross-reference to member name storage 200. Only as much storage space as needed may be allocated in the member name storage 220. However, this approach typically is very complicated to handle. Consider storing such a record into a disk file. If the member name is not part of the data structure, the member name not only must be stored in a separate storage location, but must also be stored in such way that adding, editing and/or deleting the data structure, including the member name, is fast and easy. However, this is very difficult to achieve if the member name is not part of the data structure and the member name is stored in a separate storage location.

The present invention is directed to overcoming, or at least reducing the effects of, one or more of the problems set forth above.

SUMMARY OF THE INVENTION

In one aspect of the present invention, a method is provided, the method comprising defining an actual size of each variable in a programming language at a declaration time when the actual size of the respective variable can be defined and declaring at least one variable in the programming language to have a dynamic size at the declaration time when the actual size of the at least one variable is not known. The method also comprises defining the actual size of the at least one variable in the programming language when the actual size of the at least one variable becomes known after the declaration time.

In another aspect of the present invention, a computer-readable, program storage device is provided, encoded with instructions that, when executed by a computer, perform a method, the method comprising defining an actual size of each variable in a programming language at a declaration time when the actual size of the respective variable can be defined and declaring at least one variable in the programming language to have a dynamic size at the declaration time when the actual size of the at least one variable is not known. The method also comprises defining the actual size of the at least one variable in the programming language when the actual size of the at least one variable becomes known after the declaration time.

In yet another aspect of the present invention, a computer programmed to perform a method is provided, the method comprising defining an actual size of each variable in a programming language at a declaration time when the actual size of the respective variable can be defined and declaring at least one variable in the programming language to have a dynamic size at the declaration time when the actual size of the at least one variable is not known. The method also comprises defining the actual size of the at least one variable in the programming language when the actual size of the at least one variable becomes known after the declaration time.

In still yet another aspect of the present invention, a device is provided, the device comprising means for defining an actual size of each variable in a programming language at a declaration time when the actual size of the respective variable can be defined and means for declaring at least one variable in the programming language to have a dynamic size at the declaration time when the actual size of the at least one variable is not known. The device also comprises means for defining the actual size of the at least one variable in the programming language when the actual size of the at least one variable becomes known after the declaration time.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
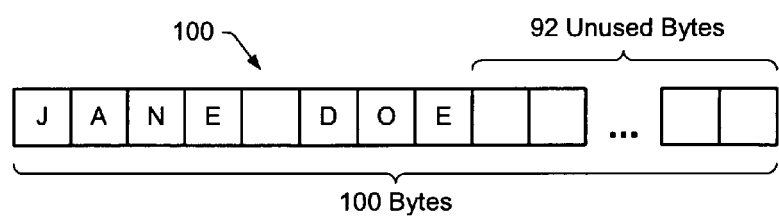
FIG. 1 schematically illustrates a conventional means of storing data into a storage area.
Figure 2:
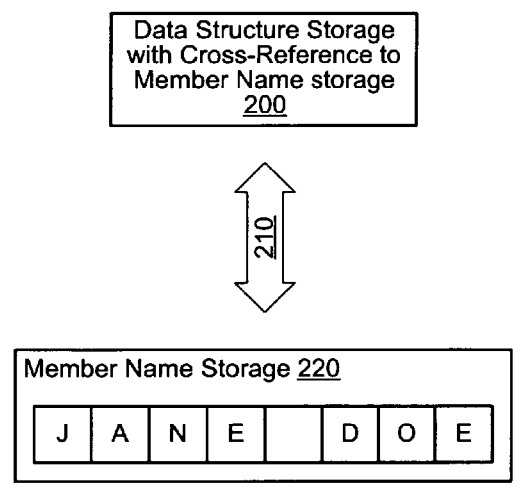
FIG. 2 schematically illustrates another conventional means of storing data into a storage area.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 3:
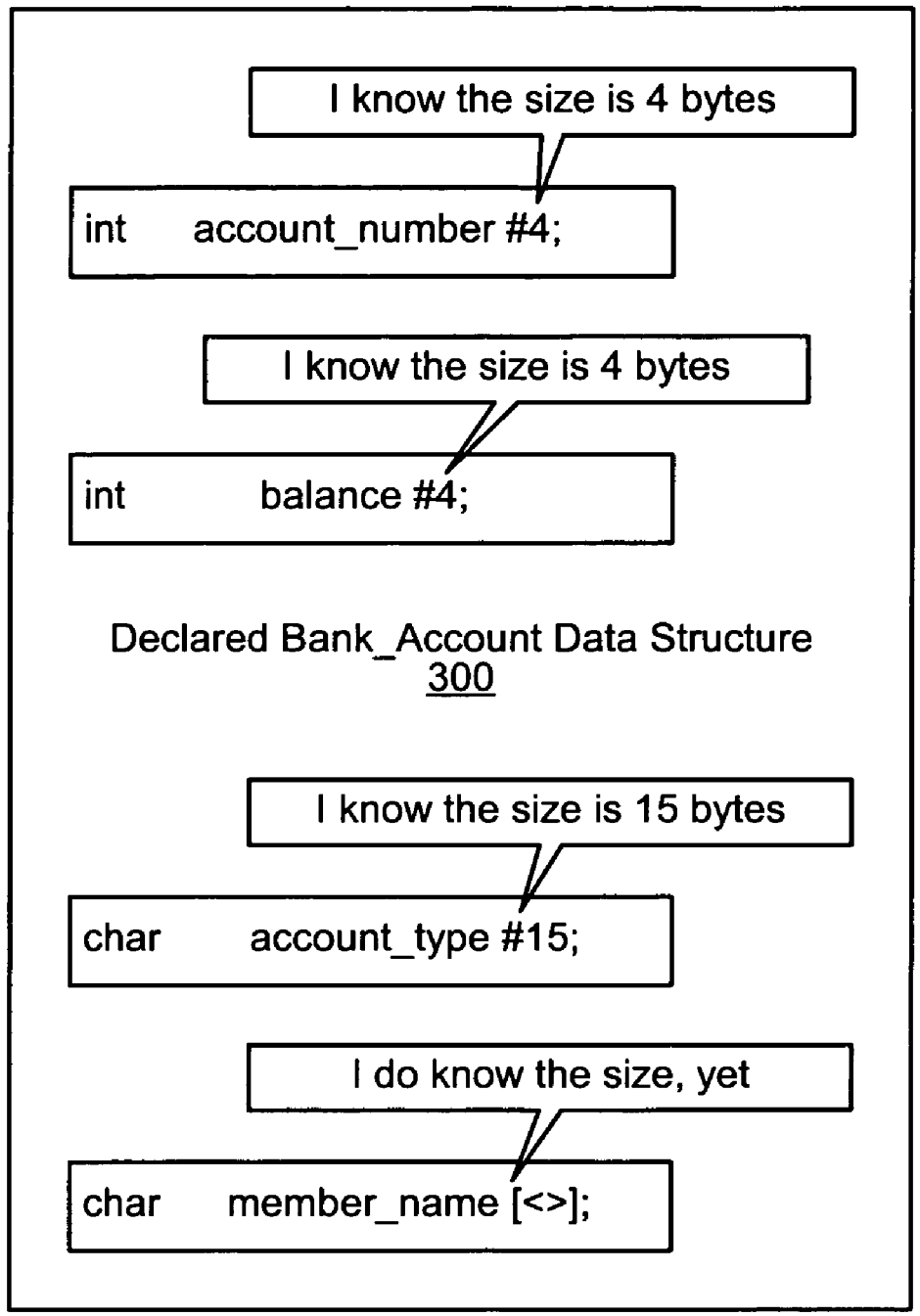
FIGS. 3–12 schematically illustrate various embodiments of a method and a device according to the present invention.

Illustrative embodiments of a method and a device according to the present invention are shown in FIGS. 3–12. As shown in FIG. 3, in various illustrative embodiments of the present invention, the programming language may provide variable types whose sizes may be defined at the time of defining the variable in the programming language. For example, as described above, in the C programming language, the variable type "int" (for integer type) is defined as a 32-bit signed integer quantity int i=±$b_{31}b_{30}b_{29}$ ... $b_3b_2b_1$, where $b_{31}$ is the most significant bit, $b_1$ is the least significant bit and ± is the sign bit. In various illustrative embodiments of the present invention, the programming language may instead define the variable type "int" (for integer type) as int i#4=$B_4B_3B_2B_1$=±$b_{31}b_{30}b_{29}$ ... $b_3b_2b_1$, a 4 byte (32-bit) signed integer quantity, where #4 defines the storage space (4 bytes) required, $b_{31}$ is the most significant bit, $b_1$ is the least significant bit and ± is the sign bit.

In various illustrative embodiments of the present invention, this will require tags saying "This variable has a dynamic size" for the declaration time, the time when the dynamic size is not known. In various illustrative embodiments of the present invention, the programming languages also allow the programmer to define new data types (variables) by combining together other dynamic and/or variable types. For example, as shown in FIG. 3, a variable type "Bank_Account" can have the following data types:

```
struct Bank_Account {
    int     account_no #4;
    int     balance #4;
    char    account_type #15;
    char    member_name[<>];
};
``` where the notation "<>" in the last member of declared Bank_Account data structure 300, "member_name," says "I do not know the size, yet" or, equivalently, "The size of member_name is not yet known." As shown in FIG. 3, the notation "#4" in the first and second members of the declared Bank_Account data structure 300, "account_no" and "balance," says "I know the size is 4 bytes" or, equivalently, "The size of account_no is known to be 4 bytes" and "The size of balance is known to be 4 bytes," respectively. Similarly, the notation "#15" in the third member of the declared Bank_Account data structure 300, "account_type," says "I know the size is 15 bytes" or, equivalently, "The size of account_type is known to be 15 bytes."

Figure 4:
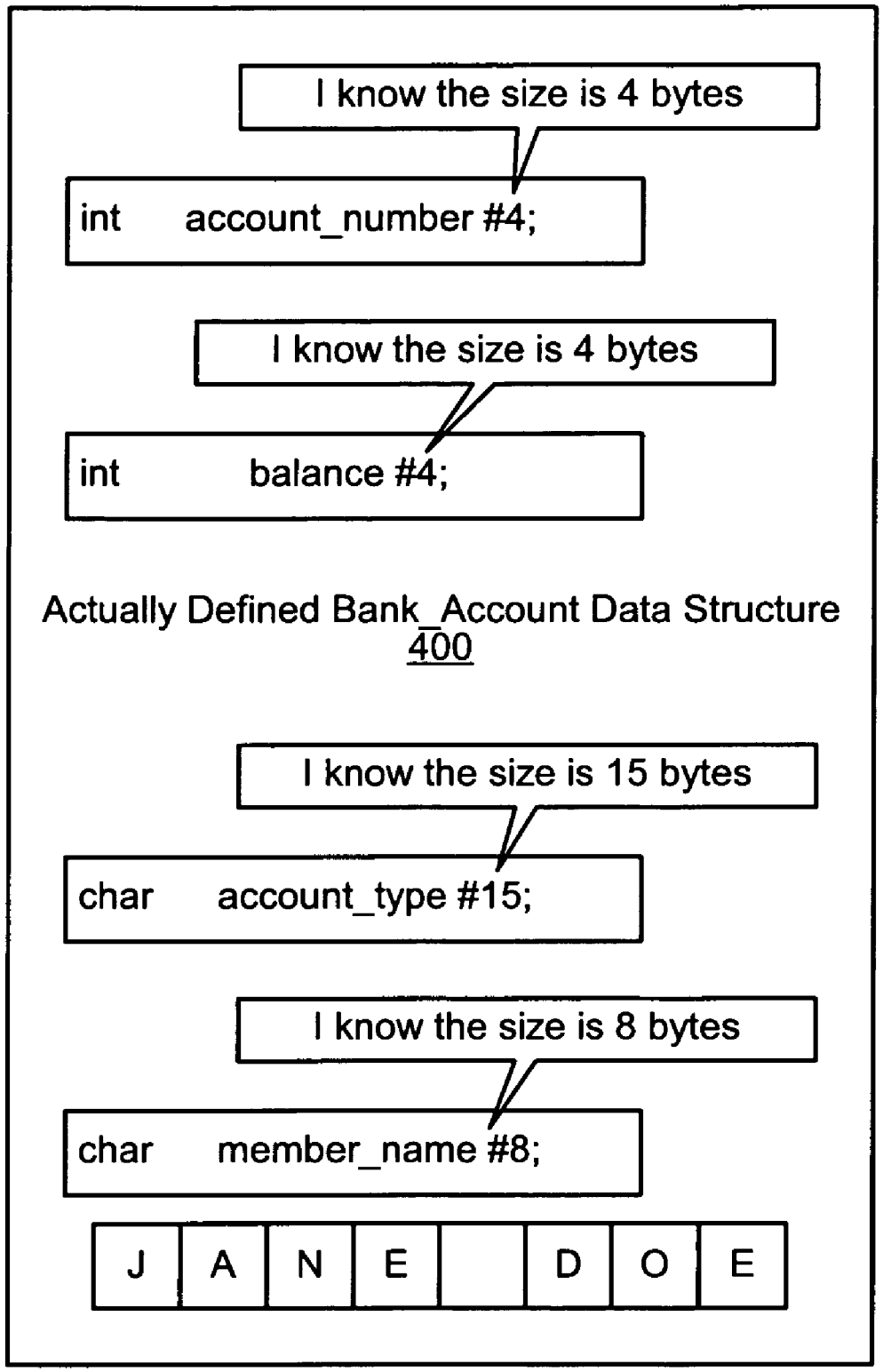

As shown in FIG. 4, when the account is actually defined, then an actually defined Bank_Account data structure 400 for actual member "Jane Doe" will be struct Bank_Account my_checking_acc::member_name#8; where the notation "#8" says "I know the size is 8 bytes" or, equivalently, "The size of member_name is known to be 8 bytes." In other words, the notation "#8" says to a compiler (not shown) at run time, rather than at compile time, that the size needed for storing member_name "Jane Doe" is 8 bytes (64 bits). This means that there is no need to reserve a maximum number of bytes for storing the name of the member so there is no wasted storage space, nor is there any need to truncate the actual member name. There is also no need to store the member name in a separate storage location from the rest of the data structure. Consequently, adding, editing and/or deleting a record is fast and easy to achieve.

In various illustrative embodiments of the present invention, fixed size arrays, defining a list of such variables without defining the sizes, will not be allowed. Whenever an array needs to be defined, the programmer will provide the sizes of all variable or dynamic sized data members in the array. For example, defining an array as follows: struct Bank_Account  CA_branch[2000]::members_names#4#6#8#9#20#10 ... ; defines 2000 accounts with member name sizes of 4 bytes, 6 bytes, 8 bytes, 9 bytes, 20 bytes, 10 bytes and so forth.

Figure 5:
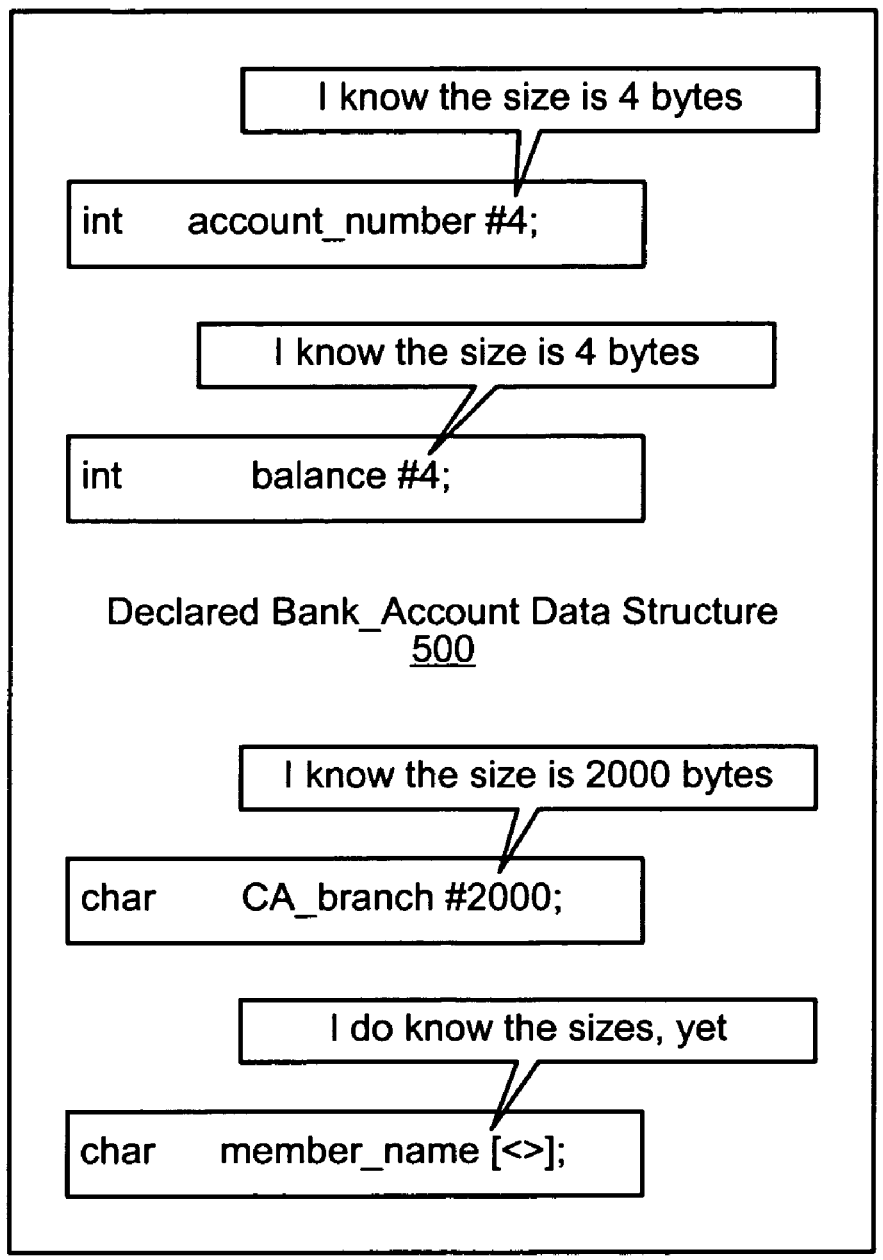

For example, as shown in FIG. 5, an array variable type "Bank_Account" can have the following data types:

```
struct Bank_Account {
    int     account_no #4;
    int     balance #4;
    char    CA_branch #2000;
    char    members_names[<>];
};
``` where the notation "<>" in the last member of declared Bank_Account data structure 500, "members_names," says "I do not know the sizes, yet" or, equivalently, "The sizes of members_names are not yet known." As shown in FIG. 5, the notation "#4" in the first and second members of the declared Bank_Account data structure 500, "account_no" and "balance," says "I know the size is 4 bytes" or, equivalently, "The size of account_no is known to be 4 bytes" and "The size of balance is known to be 4 bytes," respectively. Similarly, the notation "#2000" in the third member of the declared Bank_Account data structure 500, "CA_branch," says "I know the size is 2000 bytes" or, equivalently, "The size of CA_branch is known to be 2000 bytes."

Figure 6:
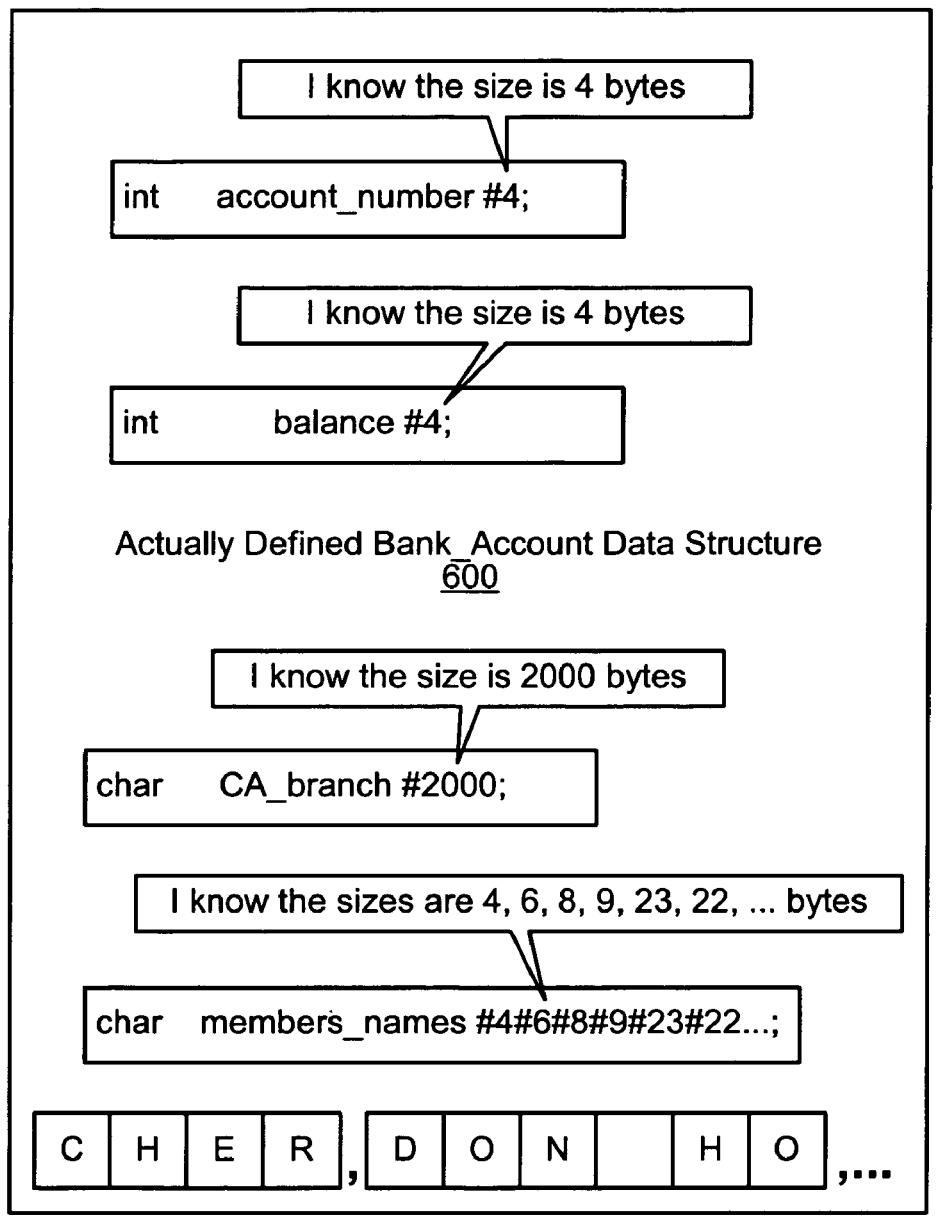

As shown in FIG. 6, when the accounts are actually defined, then an actually defined Bank_Account data structure 600 for actual members "Cher," "Don Ho," "Jane Doe," "James Doe," "Caroline Bowles Furlong," "Grant Davidson Greenly," et al. will be struct Bank_Account CA_branch [2000]::member_name#4#6#8#9#23#22 . . . ; where the notation "#4#6#8#9#23#22 . . . " says "I know the sizes are 4 bytes, 6 bytes, 8 bytes, 9 bytes, 23 bytes, 22 bytes, and so forth" or, equivalently, "The sizes of members_names are known to be 4 bytes, 6 bytes, 8 bytes, 9 bytes, 23 bytes, 22 bytes, and so forth." In other words, the notation "#4#6#8#9#23#22 . . . " says to the compiler (not shown) at run time, rather than at compile time, that the sizes needed for storing members_names "Cher," "Don Ho," "Jane Doe," "James Doe," "Caroline Bowles Furlong," "Grant Davidson Greenly," et al. are 4 bytes (32 bits), 6 bytes (48 bits), 8 bytes (64 bits), 9 bytes (72 bits), 23 bytes (184 bits), 22 bytes (176 bits), and so forth. This means that there is no need to reserve maximum numbers of bytes for storing the names of the members so there is no wasted storage space, nor is there any need to truncate the actual members names. There is also no need to store the members names in a separate storage location from the rest of the data structure. Consequently, adding, editing and/or deleting a record is fast and easy to achieve.

Figure 7:
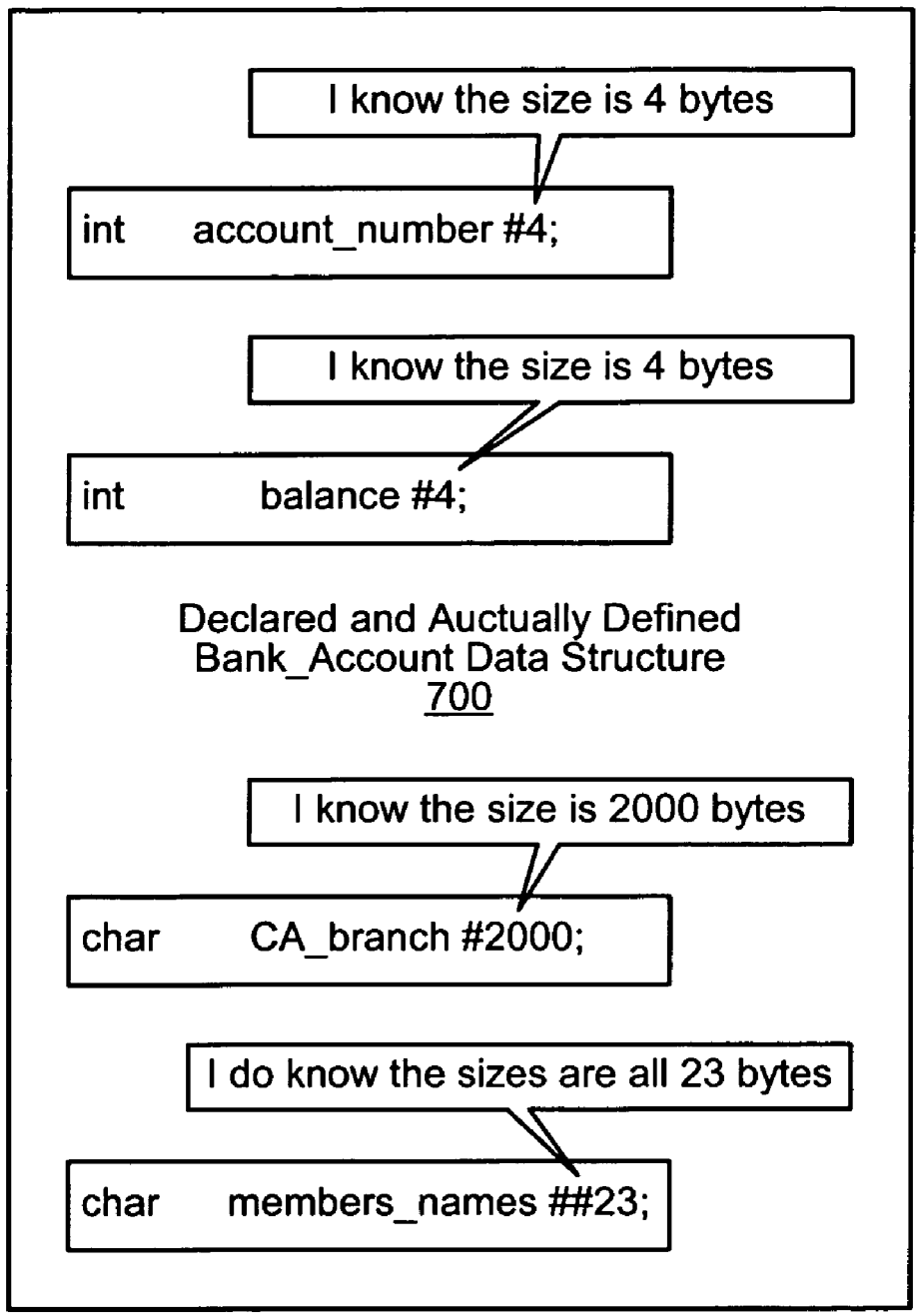

Programmers may define a uniform size for all the members of the array, such as struct Bank_Account CA_branch [2000]::member_name ##20; defining 2000 accounts each with member name sizes of 20 bytes. For example, as shown in FIG. 7, an array variable type "Bank_Account" can have the following data types:

```
struct Bank_Account {
    int     account_no #4;
    int     balance #4;
    char    CA_branch #2000;
    char    members_names ##23;
};
``` where the notation "##23" in the last member of declared and actually defined Bank_Account data structure 700, "members_names," says "I know the sizes are all 23 bytes" or, equivalently, "The sizes of members_names are all 23 bytes." As shown in FIG. 7, the notation "#4" in the first and second members of the declared and actually defined Bank_Account data structure 700, "account_no" and "balance," says "I know the size is 4 bytes" or, equivalently, "The size of account_no is known to be 4 bytes" and "The size of balance is known to be 4 bytes," respectively. Similarly, the notation "#2000" in the third member of the declared and actually defined Bank_Account data structure 700, "CA_branch," says "I know the size is 2000 bytes" or, equivalently, "The size of CA_branch is known to be 2000 bytes."

In various illustrative embodiments of the present invention, compilers (not shown) may be required to perform functions at run time rather than at compile time. For example, the compiler may be required to calculate offsets in an array and/or use the sizeof( ) operator at run time rather than at compile time. For example, in the C programming language, when the following C program snippet:

char name [20];
    int size;
    size=sizeof (name);

is conventionally compiled, the line "size=sizeof(name);" will become "size=20" (bytes). This transformation is performed by the compiler. In this case, the executable program will always have "size=20" (bytes). In other words, the size is fixed in the executable, as described above in the description of conventional schemes. By way of contrast, in various illustrative embodiments of the present invention, "size=sizeof(name);" will compile to "size=_calculate_size_of_variable='name'" where "_calculate_size_of_variable" is a language operator that will compute the size of the variable 'name' during program execution, so that size is no longer fixed in the executable.

FIGS. 8–12 schematically illustrate particular embodiments of respective methods 800–1200 practiced in accordance with the present invention. FIGS. 3–7 schematically illustrate various exemplary particular embodiments with which the methods 800–1200 may be practiced. For the sake of clarity, and to further an understanding of the invention, the methods 800–1200 shall be disclosed in the context of the various exemplary particular embodiments shown in FIGS. 3–7. However, the present invention is not so limited and admits wide variation, as is discussed further below.

Figure 8:
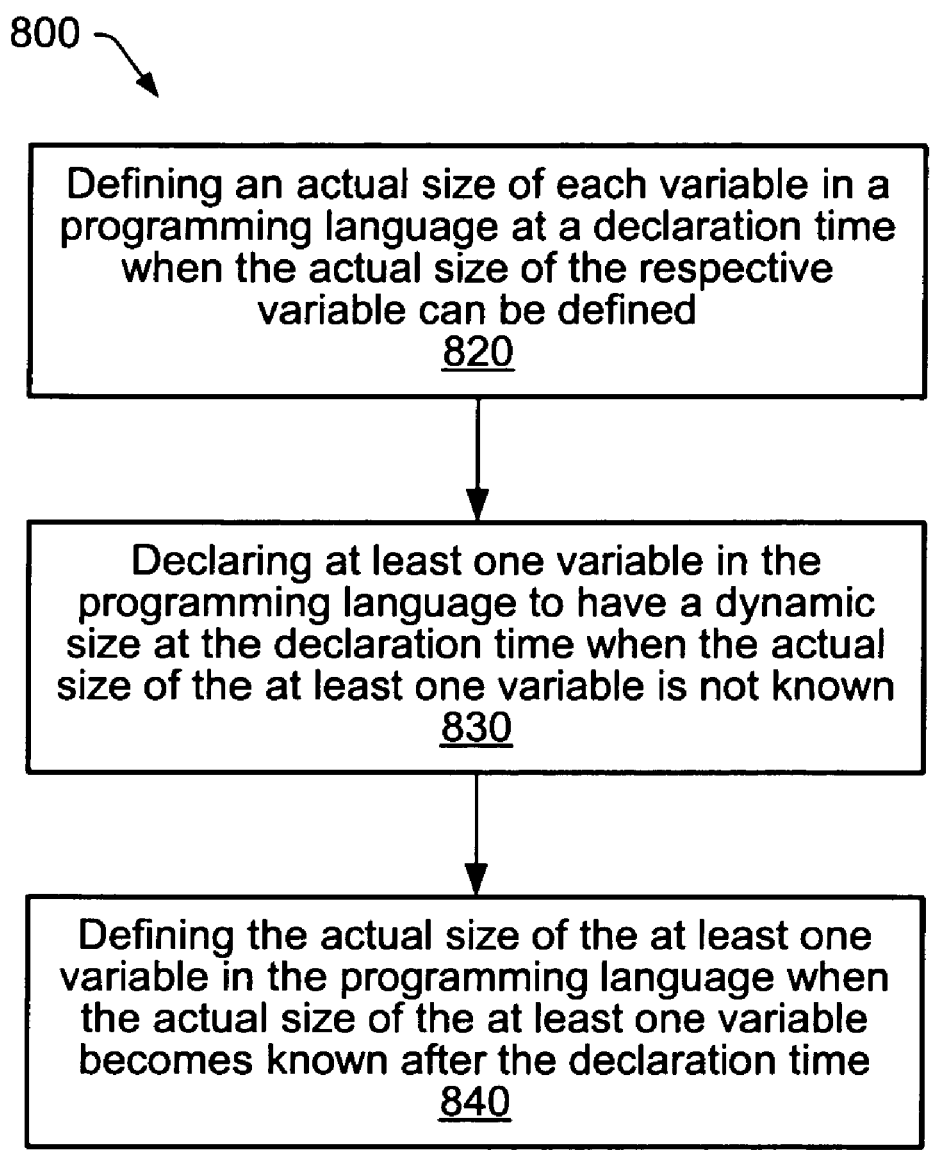
Figure 9:
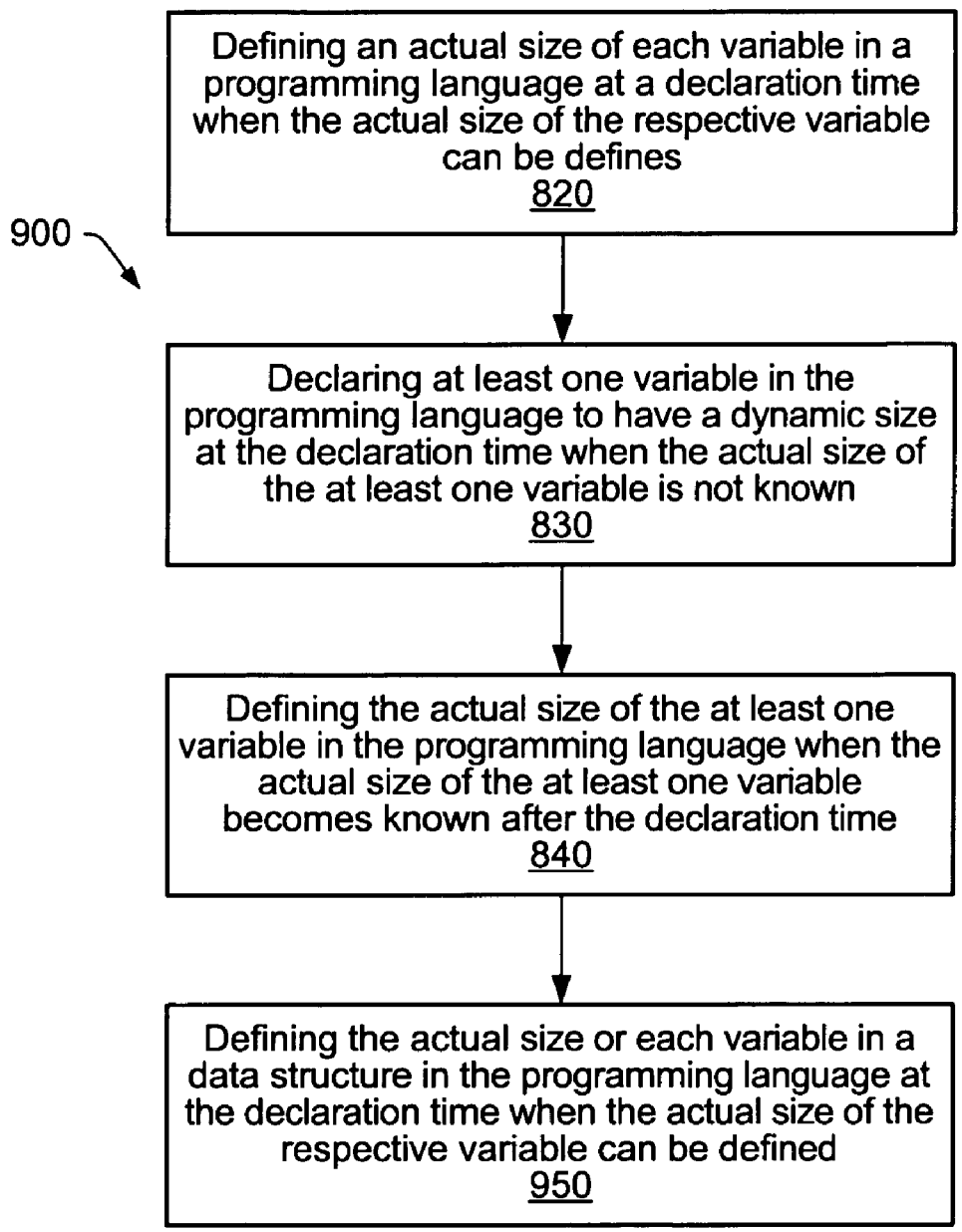

As shown in FIG. 8, the method 800 begins, as set forth in box 820, by defining an actual size of each variable in a programming language at a declaration time when the actual size of the respective variable can be defined. For example, as shown in FIG. 9 and as set forth in box 950 of method 900, the actual sizes of the first, second and third members of the declared Bank_Account data structure 300, "account_no," "balance" and "account_type," as shown in FIG. 3, are known and may be defined to be "#4," "#4" and "#15," respectively, at the declaration time.

Figure 10:
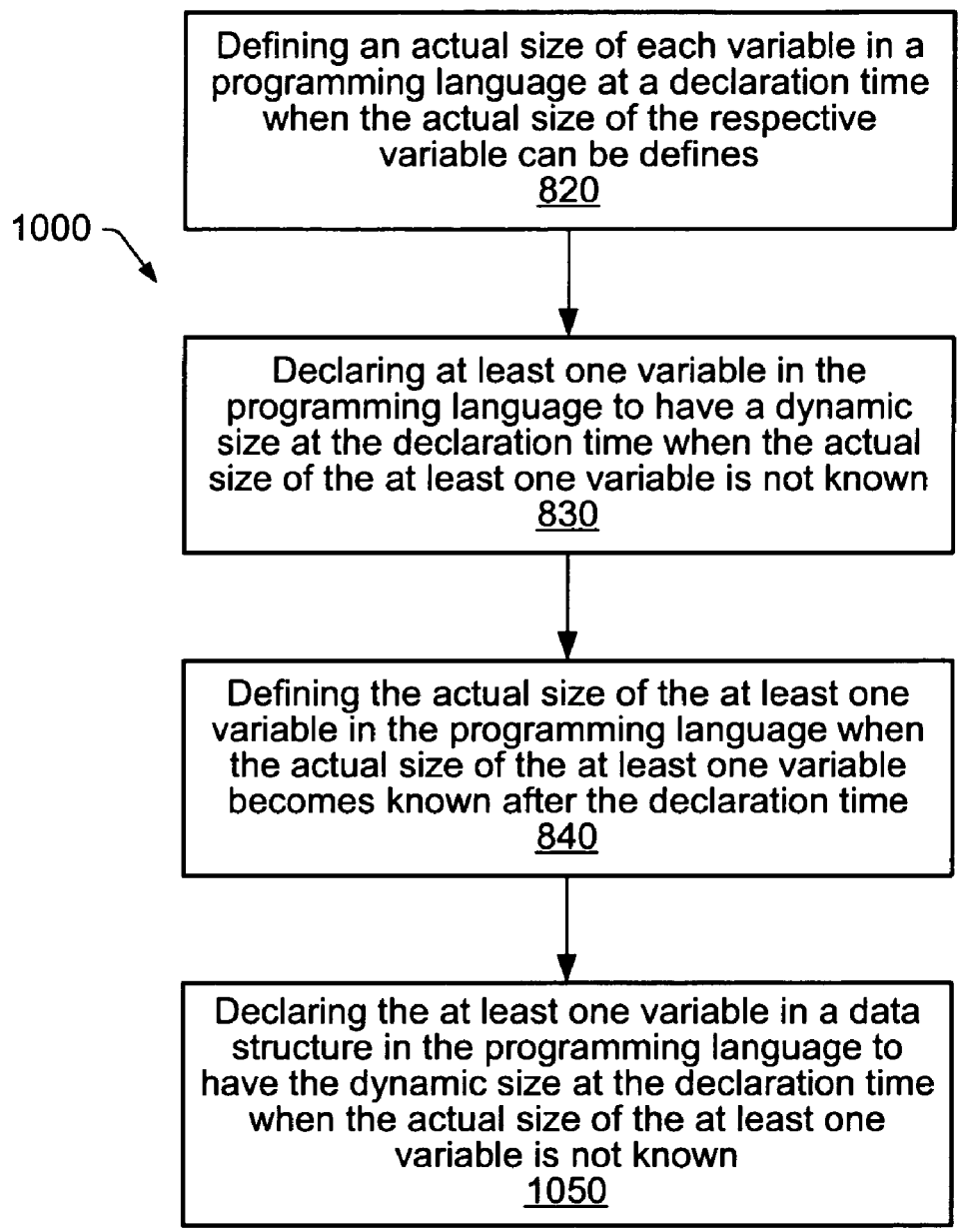

The method 800 proceeds by declaring at least one variable in the programming language to have a dynamic size at the declaration time when the actual size of the at least one variable is not known, as set forth in box 830. For example, as shown in FIG. 10 and as set forth in box 1050 of method 1000, the actual size of the last member of the declared Bank_Account data structure 300, "member_name," as shown in FIG. 3, is not known at the declaration time and may be declared to have a dynamic size "<>" at the declaration time.

Figure 11:
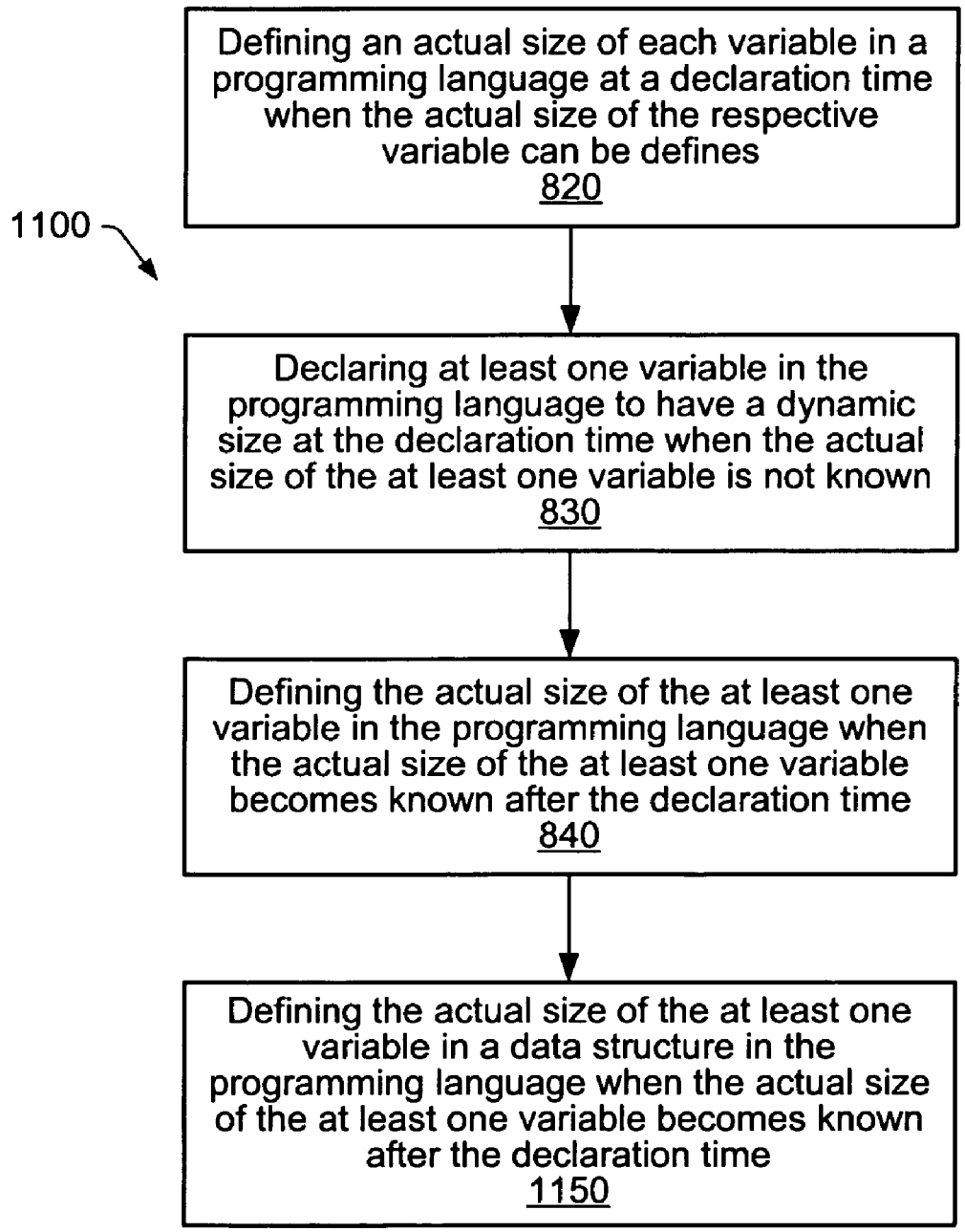
Figure 12:
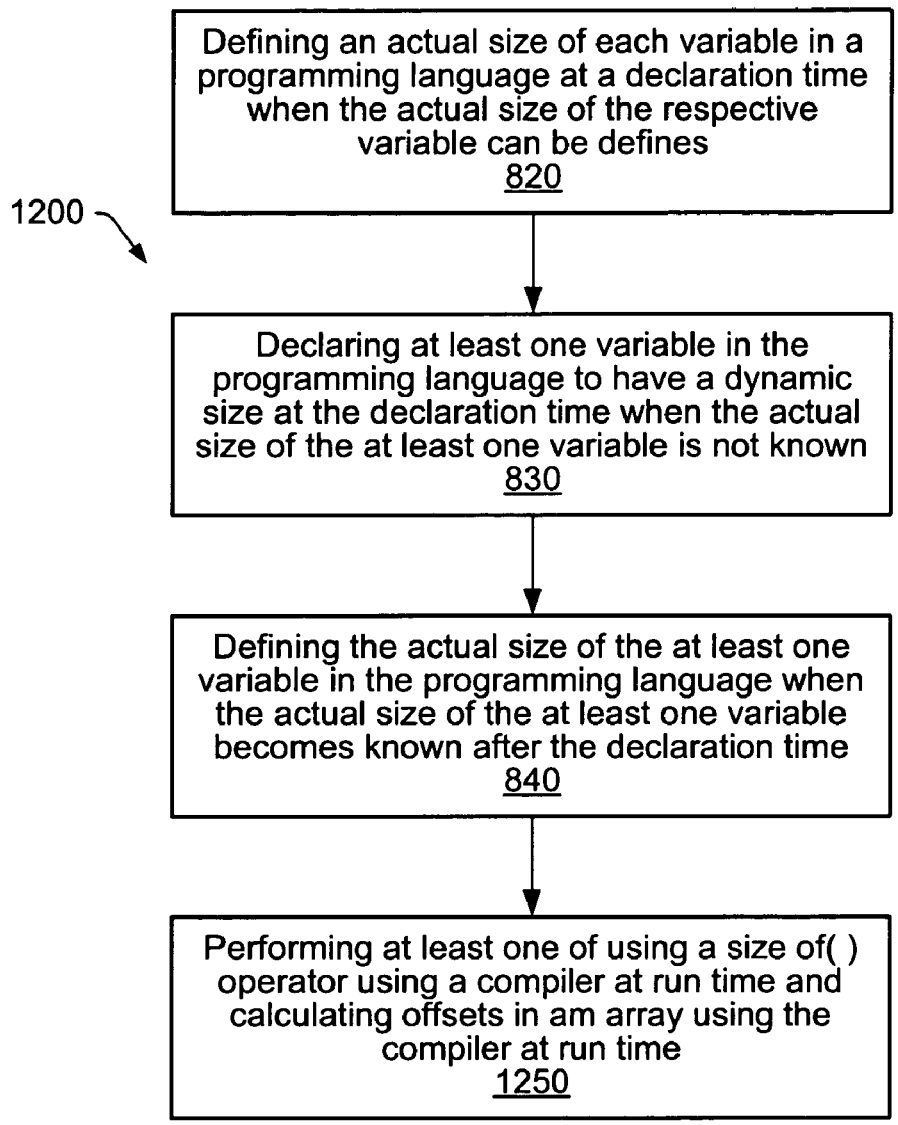

The method 800 then proceeds, as set forth in box 840, by defining the actual size of the at least one variable in the programming language when the actual size of the at least one variable becomes known after the declaration time. For example, as shown in FIG. 11 and as set forth in box 1150 of method 1100, the actual size of the last member of the actually defined Bank_Account data structure 400, "member_name," as shown in FIG. 4, is known and may be defined to be "#8" after the declaration time. For example, as shown in FIG. 12 and as set forth in box 1250 of method 1200, a compiler (not shown) may be required to perform functions at run time rather than at compile time. The compiler may be required to calculate offsets in an array and/or use the sizeof( ) operator at run time rather than at compile time, for example, as described above.

Any of the above-disclosed embodiments of a method according to the present invention enables dynamic and/or variable sized data members to be used for record management, without excess wasted storage space and/or truncation and without the programmer having to allocate separate storage space for storing data that can take variable space depending on requirements. Additionally, any of the above-disclosed embodiments of a method according to the present invention enables dynamic and/or variable sized data members to be made a part of the same record and to be easily managed.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a–b") disclosed herein is to be understood as referring to the power set (the set of all subsets) of the respective range of values, in the sense of Georg Cantor. Accordingly, the protection sought herein is as set forth in the claims below.

What is claimed:

1. A computer-implemented method for memory management comprising:
   defining an actual size of each variable in a computer program at a declaration time if the actual size of the respective variable can be determined; and
   minimizing a memory footprint for at least one variable in the computer program, comprising:
      declaring the at least one variable in the computer program to have a dynamic size at the declaration time if the actual size of the at least one variable is not known; and
      defining the actual size of the at least one variable in the computer program when the actual size of the at least one variable becomes known after the declaration time.

2. The computer-implemented method of claim 1, wherein defining the actual size of each variable in the computer program at the declaration time if the actual size of the respective variable can be determined comprises defining the actual size of each variable in a data structure in the computer program at the declaration time if the actual size of the respective variable can be determined.

3. The computer-implemented method of claim 2, wherein declaring the at least one variable in the computer program to have the dynamic size at the declaration time if the actual size of the at least one variable is not known comprises declaring the at least one variable in the data structure in the computer program to have the dynamic size at the declaration time if the actual size of the at least one variable is not known.

4. The computer-implemented method of claim 3, wherein defining the actual size of the at least one variable in the computer program when the actual size of the at least one variable becomes known after the declaration time comprises defining the actual size of the at least one variable in a data structure in the computer program when the actual size of the at least one variable becomes known after the declaration time.

5. The computer-implemented method of claim 4, wherein defining the actual size of the at least one variable in the computer program when the actual size of the at least one variable becomes known after the declaration time comprises performing at least one of using a sizeof( ) operator using a compiler at run time and calculating offsets in an array using the compiler at run time.

6. The computer-implemented method of claim 2, wherein defining the actual size of the at least one variable in the computer program when the actual size of the at least one variable becomes known after the declaration time comprises defining the actual size of the at least one variable in a data structure in the computer program when the actual size of the at least one variable becomes known after the declaration time.

7. The computer-implemented method of claim 1, wherein declaring the at least one variable in the computer program to have the dynamic size at the declaration time if the actual size of the at least one variable is not known comprises declaring the at least one variable in a data structure in the computer program to have the dynamic size at the declaration time if the actual size of the at least one variable is not known.

8. The computer-implemented method of claim 7, wherein defining the actual size of the at least one variable in the computer program when the actual size of the at least one variable becomes known after the declaration time comprises defining the actual size of the at least one variable in a data structure in the computer program when the actual size of the at least one variable becomes known after the declaration time.

9. The computer-implemented method of claim 1, wherein defining the actual size of the at least one variable in the computer program when the actual size of the at least one variable becomes known after the declaration time comprises defining the actual size of the at least one variable in a data structure in the computer program when the actual size of the at least one variable becomes known after the declaration time.

10. The computer-implemented method of claim 1, wherein defining the actual size of the at least one variable in the computer program when the actual size of the at least one variable becomes known after the declaration time comprises performing at least one of using a sizeof( ) operator using a compiler at run time and calculating offsets in an array using the compiler at run time.

11. A computer-readable, program storage device, encoded with instructions that, when executed by a computer, perform a method comprising:
   defining an actual size of each variable in a programming language at a declaration time when the actual size of the respective variable can be defined;
   declaring at least one variable in the programming language to have a dynamic size at the declaration time when the actual size of the at least one variable is not known; and
   defining the actual size of the at least one variable in the programming language when the actual size of the at least one variable becomes known after the declaration time.

12. The device of claim 11, wherein defining the actual size of each variable in the programming language at the declaration time when the actual size of the respective variable can be defined comprises defining the actual size of each variable in a data structure in the programming language at the declaration time when the actual size of the respective variable can be defined.

13. The device of claim 12, wherein declaring the at least one variable in the programming language to have the dynamic size at the declaration time when the actual size of the at least one variable is not known comprises declaring the at least one variable in the data structure in the programming language to have the dynamic size at the declaration time when the actual size of the at least one variable is not known.

14. The device of claim 13, wherein defining the actual size of the at least one variable in the programming language when the actual size of the at least one variable becomes known after the declaration time comprises defining the actual size of the at least one variable in a data structure in the programming language when the actual size of the at least one variable becomes known after the declaration time.

15. The device of claim 14, wherein defining the actual size of the at least one variable in the programming language when the actual size of the at least one variable becomes known after the declaration time comprises performing at least one of using a sizeof( ) operator using a compiler at run time and calculating offsets in an array using the compiler at run time.

16. The device of claim 12, wherein defining the actual size of the at least one variable in the programming language when the actual size of the at least one variable becomes known after the declaration time comprises defining the actual size of the at least one variable in a data structure in the programming language when the actual size of the at least one variable becomes known after the declaration time.

17. The device of claim 11, wherein declaring the at least one variable in the programming language to have the dynamic size at the declaration time when the actual size of the at least one variable is not known comprises declaring the at least one variable in a data structure in the programming language to have the dynamic size at the declaration time when the actual size of the at least one variable is not known.

18. The device of claim 17, wherein defining the actual size of the at least one variable in the programming language when the actual size of the at least one variable becomes known after the declaration time comprises defining the actual size of the at least one variable in a data structure in the programming language when the actual size of the at least one variable becomes known after the declaration time.

19. The device of claim 11, wherein defining the actual size of the at least one variable in the programming language when the actual size of the at least one variable becomes known after the declaration time comprises defining the actual size of the at least one variable in a data structure in the programming language when the actual size of the at least one variable becomes known after the declaration time.

20. The device of claim 11, wherein defining the actual size of the at least one variable in the programming language when the actual size of the at least one variable becomes known after the declaration time comprises performing at least one of using a sizeof( ) operator using a compiler at run time and calculating offsets in an array using the compiler at run time.

21. A computer programmed to perform a method comprising:
  defining an actual size of each variable in a programming language at a declaration time when the actual size of the respective variable can be defined;
  declaring at least one variable in the programming language to have a dynamic size at the declaration time when the actual size of the at least one variable is not known; and
  defining the actual size of the at least one variable in the programming language when the actual size of the at least one variable becomes known after the declaration time.

22. The computer of claim 21, wherein defining the actual size of each variable in the programming language at the declaration time when the actual size of the respective variable can be defined comprises defining the actual size of each variable in a data structure in the programming language at the declaration time when the actual size of the respective variable can be defined.

23. The computer of claim 22, wherein declaring the at least one variable in the programming language to have the dynamic size at the declaration time when the actual size of the at least one variable is not known comprises declaring the at least one variable in the data structure in the programming language to have the dynamic size at the declaration time when the actual size of the at least one variable is not known.

24. The computer of claim 23, wherein defining the actual size of the at least one variable in the programming language when the actual size of the at least one variable becomes known after the declaration time comprises defining the actual size of the at least one variable in a data structure in the programming language when the actual size of the at least one variable becomes known after the declaration time.

25. The computer of claim 24, wherein defining the actual size of the at least one variable in the programming language when the actual size of the at least one variable becomes known after the declaration time comprises performing at least one of using a sizeof( ) operator using a compiler at run time and calculating offsets in an array using the compiler at run time.

26. The computer of claim 22, wherein defining the actual size of the at least one variable in the programming language when the actual size of the at least one variable becomes known after the declaration time comprises defining the actual size of the at least one variable in a data structure in the programming language when the actual size of the at least one variable becomes known after the declaration time.

27. The computer of claim 21, wherein declaring the at least one variable in the programming language to have the dynamic size at the declaration time when the actual size of the at least one variable is not known comprises declaring the at least one variable in a data structure in the programming language to have the dynamic size at the declaration time when the actual size of the at least one variable is not known.

28. The computer of claim 27, wherein defining the actual size of the at least one variable in the programming language when the actual size of the at least one variable becomes known after the declaration time comprises defining the actual size of the at least one variable in a data structure in the programming language when the actual size of the at least one variable becomes known after the declaration time.

29. The computer of claim 21, wherein defining the actual size of the at least one variable in the programming language when the actual size of the at least one variable becomes known after the declaration time comprises defining the actual size of the at least one variable in a data structure in the programming language when the actual size of the at least one variable becomes known after the declaration time.

30. The computer of claim 21, wherein defining the actual size of the at least one variable in the programming language when the actual size of the at least one variable becomes known after the declaration time comprises performing at least one of using a sizeof( ) operator using a compiler at run time and calculating offsets in an array using the compiler at run time.

31. A device comprising:
   means for defining an actual size of each variable in a programming language at a declaration time when the actual size of the respective variable can be defined;
   means for declaring at least one variable in the programming language to have a dynamic size at the declaration time when the actual size of the at least one variable is not known; and
   means for defining the actual size of the at least one variable in the programming language when the actual size of the at least one variable becomes known after the declaration time.

32. The device of claim 31, wherein the means for defining the actual size of each variable in the programming language at the declaration time when the actual size of the respective variable can be defined comprises means for defining the actual size of each variable in a data structure in the programming language at the declaration time when the actual size of the respective variable can be defined.

33. The device of claim 32, wherein the means for declaring the at least one variable in the programming language to have the dynamic size at the declaration time when the actual size of the at least one variable is not known comprises means for declaring the at least one variable in the data structure in the programming language to have the dynamic size at the declaration time when the actual size of the at least one variable is not known.

34. The device of claim 33, wherein the means for defining the actual size of the at least one variable in the programming language when the actual size of the at least one variable becomes known after the declaration time comprises means for defining the actual size of the at least one variable in a data structure in the programming language when the actual size of the at least one variable becomes known after the declaration time.

35. The device of claim 34, wherein the means for defining the actual size of the at least one variable in the programming language when the actual size of the at least one variable becomes known after the declaration time comprises means for performing at least one of using a sizeof( ) operator using a compiler at run time and calculating offsets in an array using the compiler at run time.

36. The device of claim 32, wherein the means for defining the actual size of the at least one variable in the programming language when the actual size of the at least one variable becomes known after the declaration time comprises means for defining the actual size of the at least one variable in a data structure in the programming language when the actual size of the at least one variable becomes known after the declaration time.

37. The device of claim 31, wherein the means for declaring the at least one variable in the programming language to have the dynamic size at the declaration time when the actual size of the at least one variable is not known comprises means for declaring the at least one variable in a data structure in the programming language to have the dynamic size at the declaration time when the actual size of the at least one variable is not known.

38. The device of claim 37, wherein the means for defining the actual size of the at least one variable in the programming language when the actual size of the at least one variable becomes known after the declaration time comprises means for defining the actual size of the at least one variable in a data structure in the programming language when the actual size of the at least one variable becomes known after the declaration time.

39. The device of claim 31, wherein the means for defining the actual size of the at least one variable in the programming language when the actual size of the at least one variable becomes known after the declaration time comprises means for defining the actual size of the at least one variable in a data structure in the programming language when the actual size of the at least one variable becomes known after the declaration time.

40. The device of claim 31, wherein the means for defining the actual size of the at least one variable in the programming language when the actual size of the at least one variable becomes known after the declaration time comprises means for performing at least one of using a sizeof( ) operator using a compiler at run time and calculating offsets in an array using the compiler at run time.

* * * * *

UNITED STATES PATENT AND TRADEMARK OFFICE
CERTIFICATE OF CORRECTION

PATENT NO. : 7,020,870 B2  Page 1 of 1
APPLICATION NO. : 10/146604
DATED : March 28, 2006
INVENTOR(S) : Sumit Gupta It is certified that error appears in the above-identified patent and that said Letters Patent is hereby corrected as shown below:

Claim 1, col. 7, line 39, after "time" please add --wherein defining the actual size of the at least one variable in the computer program when the actual size of the at least one variable becomes known after the declaration time comprises performing at least one of using a sizeof( ) operator using a compiler at run time and calculating offsets in an array using the compiler at run time--.

Claim 11, col. 8, line 55, after "time" please add --wherein defining the actual size of the at least one variable in the computer program when the actual size of the at least one variable becomes known after the declaration time comprises performing at least one of using a sizeof( ) operator using a compiler at run time and calculating offsets in an array using the compiler at run time--.

Claim 21, col. 9, line 67, after "time" please add --wherein defining the actual size of the at least one variable in the computer program when the actual size of the at least one variable becomes known after the declaration time comprises performing at least one of using a sizeof( ) operator using a compiler at run time and calculating offsets in an array using the compiler at run time--.

Claim 31, col. 11, line 12, after "time" please add --wherein defining the actual size of the at least one variable in the computer program when the actual size of the at least one variable becomes known after the declaration time comprises performing at least one of using a sizeof( ) operator using a compiler at run time and calculating offsets in an array using the compiler at run time--.

Claims 5, 10, 15, 20, 25, 30, 35 and 40 have been cancelled.

Signed and Sealed this

Seventeenth Day of June, 2008

JON W. DUDAS
*Director of the United States Patent and Trademark Office*